June 5, 1945.   J. G. VILLEPIGUE   2,377,530
JACK PAD
Filed May 2, 1944

INVENTOR.
Julius G. Villepigue
BY
Attorney

Patented June 5, 1945

2,377,530

UNITED STATES PATENT OFFICE 2,377,530

JACK PAD

Julius G. Villepigue, Inglewood, Calif., assignor to North American Aviation, Inc.

Application May 2, 1944, Serial No. 533,731

4 Claims. (Cl. 254—133)

This invention relates to jack pads such as would be particularly applicable for use in conjunction with aircraft, and contemplates the provision of such members made of rubber or similar resilient material, recessed in the outer surface.

An object of the invention is the provision of an ever-ready type jack pad which, when not in use, provides a flush installation with the external surfaces of the ship, as for example, at the wing or fuselage jack-points.

Another object of the invention is to provide an improved resilient means for supporting the air plane while on the jacks.

Another object of the invention is to eliminate the need for fittings such as are usually employed in jacking operations.

Another object of the invention is the elimination of flush cover-pads or plugs for the jack pad fittings as generally necessitated in order to provide the required smooth exterior of the ship and to protect the threaded portions of the jack pad fittings.

Another object of the invention is to provide an arrangement suitable for jacking an airplane which requires no installation tools or special fittings, whereby high-speed servicing is facilitated. This is particularly important in military aircraft and is highly desirable in all servicing operations. The elimination of the need for separate parts and fittings is also particularly important in military aircraft. The insert type jack pad fittings generally used must be either carried in the ship or be available at any servicing field. Any separate or extra pieces create additional problems under combat conditions during which such parts may readily be lost, and being carried in the ship, they represent additional undesirable weight.

A further object of the present invention, is the provision of improved supporting means in that the resiliency of the rubber pad tends to prevent shifting of the plane while on the jacks. The rubber is sufficiently flexible to conform to the contour of the top of the jack regardless of the shape thereof, and will compress to form a pocket over the jack post preventing slipping and damage to the adjacent surfaces while still permitting a high degree of movement between the jack posts and the supporting structure. The resiliency of the rubber further permits self-centering and self-aligning without the necessity of providing expensive machine fittings as generally required. While servicing the air plane supported in this manner or during various testing operations at time of assembly or overhauling the resiliency of the support achieved through the present arrangement is very desirable in that vibrations are absorbed and the ship generally cushioned from shocks resulting from the foregoing operations.

The invention also comprises novel details of construction and combinations or arrangement of parts which will more fully appear in the course of the following description. However, the drawing merely shows and the description merely describes one embodiment of the present invention which is given by way of illustration or example only.

In the drawing, like reference characters designate similar parts of the several views, of which:

Figure 1:
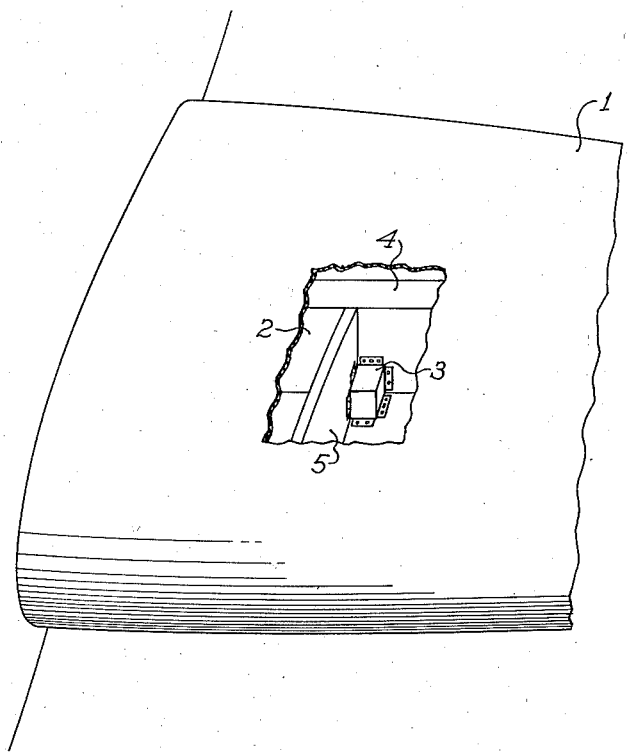
Fig. 1 is a view showing the jack pad installed in a wing having a portion of the upper surface broken away.

In Fig. 1 is shown, by way of illustration, a portion of the wing 1 of an airplane wherein the upper skin has been broken away at 2 to expose a portion of the interior construction. A cup-shaped member 3 provided with suitable attaching means in the form of flanges is installed at an appropriate location to provide a suitable jacking point for the airplane. The member 3 is so attached as to form an integral part of the load carrying structure of the airplane, as for example, to the wing spar 4 and a transverse member 5.

Figure 2:
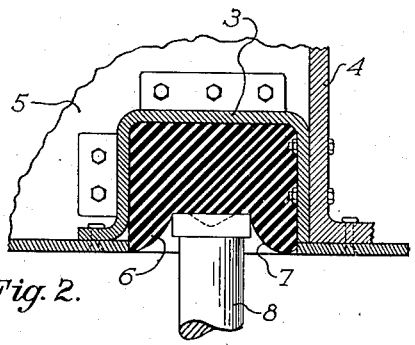
Fig. 2 is a sectional view through the jack pad while the airplane is on the jack.

A more detailed showing of the present invention is given in Fig. 2. The cup-shaped member 3 encloses a block of resilient material 6 which is herein shown in the compressed stage. A pocket 7 is formed in the resilient material over the jack post 8. The retaining cup is attached to the structure of the ship by appropriate means as for example bolting or riveting, to permit the fitting to carry the loads imposed when the airplane is supported on the jacks.

Since the resilient material will conform to the contour of the top of the jack post, the airplane may be safely jacked even when the supports are on an uneven footing, thereby precluding the necessity of undertaking such an operation only on a level surface.

Figure 3:
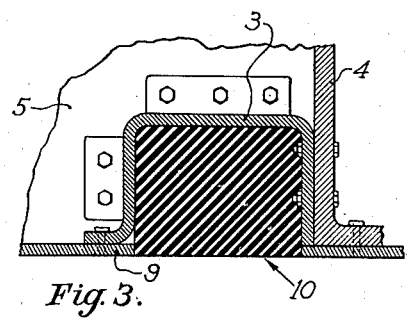
Fig. 3 is a sectional view of the jack pad in normal position.

The lower side of the cup member is open and an appropriate aperture is provided in the outer skin 9 of the airplane. As shown in Fig. 3 the resilient material, when at rest, aassumes a position providing a smooth contour to the outer surface 10 and a flush continuation of the wing skin 1. This arrangement permits the continuous external surface which is desired in order to obtain the necessary stream-lining required for high speed aircraft.

The resilient material may be retained within its restraining member by bonding to the inner surface thereof or by other appropriate provisions.

The foregoing may be taken as illustrative of one form in which the invention may be embodied, it being my intention to cover in my claims the use of any equivalent arrangement or apparatus.

I claim as my invention:

1. In combination with an aircraft member having a skin providing the majority of an air flow surface thereof, a jack pad comprising a socket in said member and a block of compressible resilient material mounted in said socket and having an outer surface forming a streamlined continuation of said skin surface.

2. For use in combination with an aircraft member having a skin forming the major portion of the air flow surface thereof, a jack pad comprising a socket adapted to be mounted in said member and a block of compressible resilient material mounted in said socket and having an outer surface adapted to form a streamlined continuation of said skin surface.

3. In combination with an aircraft wing including a skin forming an under air flow surface thereof, a jack pad comprising a downwardly-opening socket, and a block of compressible resilient material mounted in said socket and having an under surface forming a streamlined continuation of said air flow surface, said jack pad being positioned at a proper location in said wing to provide a contact surface for a jack in jacking operations upon said aircraft.

4. In combination with a structural member of an airplane, positioned to transfer the load of the plane to a jack, a jack pad comprising a block of compressible resilient material having an under surface adapted to have non-slipping engagement with the upper end of a jack, and a downwardly opening socket in said member, in which said block is supported and confined.

JULIUS G. VILLEPIGUE.